United States Patent Office 3,517,155
Patented June 23, 1970

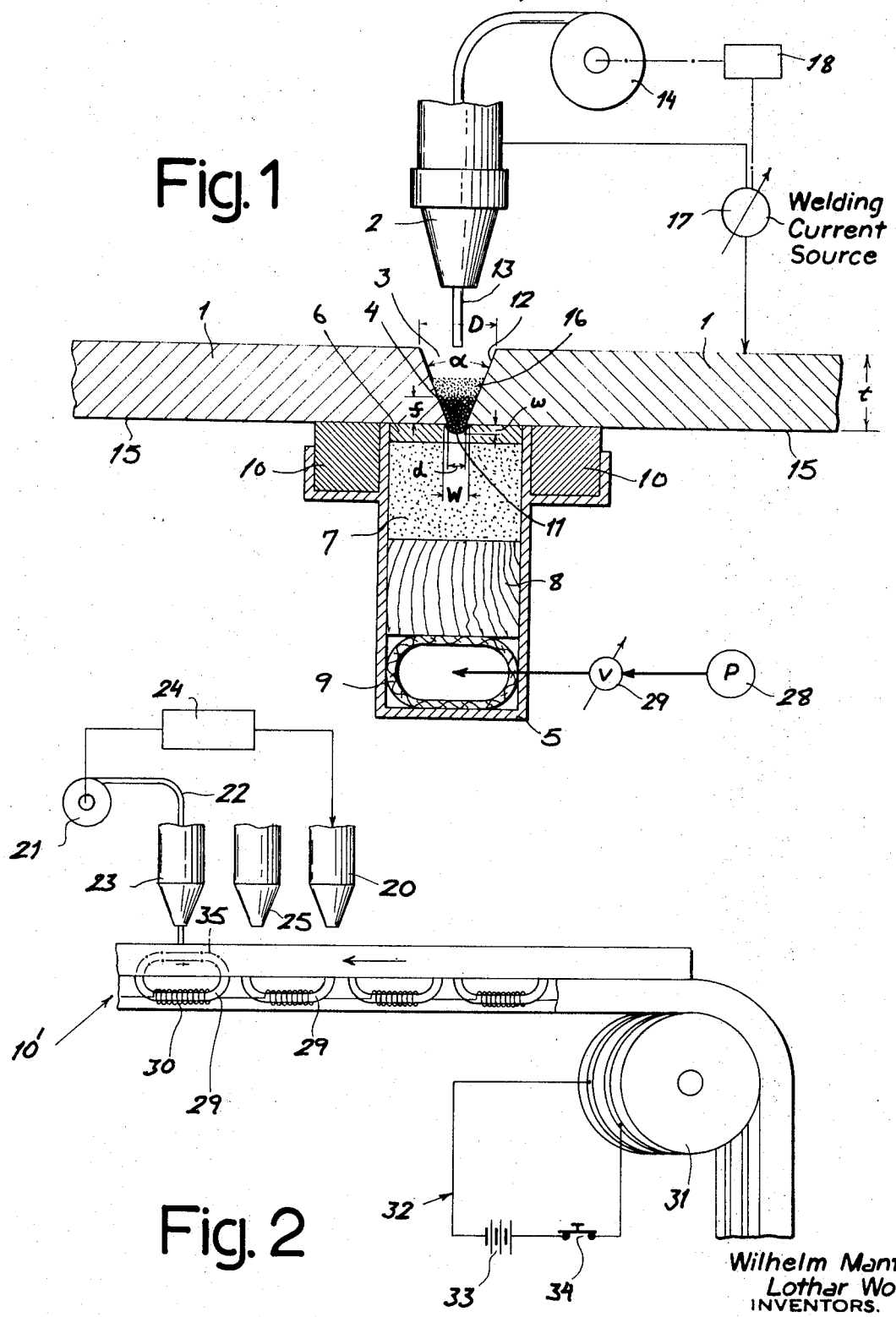

3,517,155
METHOD OF SUBMERGED-ARC WELDING OF THICK METALLIC PLATES
Wilhelm Mantel, Munich, Lothar Wolff, Pullach, and Anton Buchmeier, Hallern, Germany; said Mantel and said Wolff assignors to Linde Aktiengesellschaft, Hollriegelskreuth, Germany, a corporation of Germany
Filed Dec. 13, 1967, Ser. No. 690,127
Claims priority, application Germany, Dec. 16, 1966,
L 55,295
Int. Cl. B23k 9/18, 9/00
U.S. Cl. 219—73                                    5 Claims

ABSTRACT OF THE DISCLOSURE

A method of submerged-arc welding of relatively thick steel plates (thickness 8 mm. or greater) along a downwardly convergent elongated welding gap, wherein the undersides of the metal plates are retained in coplanar relationship at the gap by a pair of magnetic bands extending parallel to the gap on opposite sides thereof and between the magnetic bands, a copper, mineral fibers or powder layer of temperature-insensitive material is urged upwardly against the undersides of the plates to form a floor for the gap; the latter is partly filled with steel granules and then a welding flux in powdered form prior to be welded from the opposite side of the plates by an electrode wire whose arc is submerged in the powder within the gap.

---

Our present invention relates to a method of submerged-arc welding of relatively thick steel plates in approximately contiguous relationship and from one side only of the welding seam.

The submerged-arc welding process has generally been used heretofore for relatively thick steel plates, i.e. plates having a thickness in excess of 8 mm., whereby the welding must be carried out on both sides of the weld seam to ensure a homogeneous weld cross-section throughout the seam. In the submerged-arc welding process, the heat of an arc between a base-metal electrode wire and a workpiece is used to melt the electrode wire and deposit the metal thereof as a bead of weldment along the weld seam while at least partially melting the adjoining area of the workpieces to permit bonding of the weldment thereto and at least limited diffusion of the weld metal into the lattice structure of the workpiece material. The weld and arc are shielded by a blanket of granular fusible material, i.e. a flux, which renders the arc invisible and "submerged" in the blanket. The welding power may be alternating or direct current with the workpiece and electrode wire as either polarity. The welding currents and current densities are relatively high, i.e., may range from 250 to 2000 amperes, and the submerged-arc weld is characterized by deep melting of the base metal and high welding speeds. The technique has been used for welding mild steels and low-alloy steels, difficulty weldable materials such as stainless steels, copper and nickel alloys and the like. Since the process is generally carried out on a flat table or support by relatively displacing the arc electrode and the workpiece (either may be moved), high-welding speed permits the production of the weld seam along the edges of steel plates at rates which are substantially above those attainable with other arc methods. Accordingly, the fact that a single pass of the welding head along the seams does not deposit sufficient material to complete the seam and a further pass is required with reversal of the workpiece poses substantial problems when relatively thick plates, i.e. those having a thickness in excess of 8 mm. are used. Not only do these considerations require mechanism for turning large metallic plates, a weld time twice that required for single-pass systems and a great deal more effort, labor and skill than would otherwise be necessary, but the double-side passes (especially in ship-building technology) have the significant disadvantage that the quality of the weld is not always satisfactory and is difficult to improve.

It is, therefore, the principal object of the present invention to provide a method of welding relatively long seams (of the order of 12 meters) between relatively thick steel plates in which welding from only a single side is necessary, the weldment can be deposited at high rates with good bonding to the workpieces, and the system is particularly satisfactory for the sealing of ship-hull plates.

Another object of this invention is to provide an apparatus for the submerged arc welding of thick steel plates which requires only single-side deposition of the weldment.

We have now found that these objects can be attained by a method for the welding of continuous seams between relatively thick steel plates, i.e. steel plates with a thickness in excess of 8 mm., wherein the steel plates are positioned with at least their undersides in a common plane and in substantially contiguous relationship with a welding gap along their juxtaposed edges, the gap being of V, Y or U section so as to have a root at this plane with an aperture less than that of the mouth of this gap; a backing layer is applied to the underside of the plates at the foot of the gap and is urged upwardly against the plate under fluid (e.g. hydraulic or pneumatic) pressure, the layer being relatively temperature insensitive. The plates are maintained in coplanar relationship at their undersides by magnetic means, e.g. a pair of magnetic bands extending parallel to the gap between the plates and containing permanent or electromagnets whose magnetic fields are closed through the respective plates so that the fields do not include any component transverse or athwart the gap between the bands, the latter being spaced away from the welding gap by a distance sufficient to preclude any influence of the magnetic field on the welding arc. Thus, the hydraulic or pneumatic pressure urging the temperature-insensitive layer against the underside of the plate at the narrow end or foot of the gap profile, thereby closing the gap at its bottom, acts counter to the downward force of the magnetic band. The gap is, as in submerged-arc welding systems, filled with a powder or granular fusible material, preferably steel granules adapted to fill at least the root portions of the gap and, thereabove, at least a layer of a flux powder commonly used in submerged arc welding. The single electrode wire is fed between the flanks of the gap substantially in the median vertical plane between the plates and a submerged arc established between the electrode wire and the plates with a current selected such that the electrode wire melts at a rate (weight per unit time) whereby the quantity of the wire melted by the arc is 1.0 to 1.4 times that of the steel granules.

We have found, more specifically, that the system described above can be used to weld plates with a thickness in excess of 8 mm. together from one side with the formation of an effective seam of homogeneous cross-section where earlier arrangements using backing plates have proved ineffective with respect to the quality of the seam. It appears that the surprising and effective results obtained by our method derives from the combination of the use of the steel granules, magnetic means for drawing the plate downwardly and positively eliminating variation in the position of the underside of the plates by welding them into a common horizontal plate, and the upward pressure of the backing plate or layer from the underside of the latter to define the bottom or floor of the gap. The magnetic bands prevent shifting of the plates and eliminate variations in the dimension of the gap so as to ensure an unobjectionable throughgoing weld seam.

According to a more specific feature of the invention, the flanks of the gap converge downwardly toward the undersides of the plates which are magnetically retained in a common horizontal plate as indicated earlier while the backing plate is pushed upwardly against the undersides of the plates between the magnetic retaining pass. The steel granules filling the narrow portion of the gap have been found to fuse without the formation of irregular weld seams of the type formed when a backing plate is employed and the only source of the weld metal is the electrode wire. The steel granules and the flux powder can be added continuously in succession ahead of the weld. The steel granules are a composition similar to that of the plates although this composition may be varied for metallurgical purposes. This arrangement has been found a significant improvement over systems requiring the laying in of weld wires in the gap to permit the welding of thick plates. Moreover, the backing plate may have a channel registering with the root window of the gap into which the steel granules may pass to form a bead in the core of welding.

We have found that certain relationships are highly desirable and may even be critical to the optimal formation of a weld, especially when the plates exceed 8 mm. of thickness. Thus, we have found that the upward pressure on the backing layers should be between 0.1 and 0.2 atmospheres above atmospheric while the layer itself may be copper or like metal of high thermal conductivity, a web (e.g. of fusible material such as glass fiber) or a heat-resistant powder. At higher pressures, it appears that weld inclusions and defects develop in the lower bead. The ratio of electrode wire to steel granules fused during the welding process has also been found to be important and, again, may be critical to an optimum welding of the thick bodies. The quantity (by weight) of the electrode wire fused in the course of welding, should be 1.0 to 1.4 times that of the granules per unit time. The ratio can, of course, be adjusted by proper selection of the diameter of the weld wire and the welding current. Moreover, the present invention does not exclude the partial filling of the weld gap during the first pass and a subsequent deposition of weldment in the remaining gap from the side at which the original weld took place to complete the joining of the plates. It is, however, the case that the single-side weld forms a perfect bead along the underside of the plates of such nature that it is not necessary at all to deposit additional weldment from that side. Accordingly, the technique is of special importance in the shipbuilding art.

According to another aspect of this invention, the welding process is carried out with an apparatus which comprises an elongated temperature-insensitive layer which extends the full length of the weld and is received in a housing which is likewise horizontally elongated but is upwardly open to accommodate this layer and a plunger, e.g. a wooden beam or a row of blocks, which is vertically shiftable by pressure-responsive means to apply this layer against the undersides of the plates. This housing is flanked by a pair of magnetic bands with permanent or electromagnets whose flux paths are complete in themselves as previously discussed. Between the plunger and the temperature-insensitive backing layer, we provide a refractory force-transmitting layer of low thermal conductivity (ag. dry welding sand or flux powder), while the pressure-responsive means may be a distendable hose underlying the wooden plunger and expandable by the delivery of fluid under pressure to the interior of the hose. The hose may be a fabric-reinforced fire-protection hose. Copper backing plate, flux-powder layers, glass or asbestos fiber webs (with or without heat-resistant or flux powder) and combinations thereof may be used to form the temperature-insensitive layer.

Alternatively, the magnetic bands, the wooden plunger and the backing layer are subdivided longitudinally into a plurality of segments adapted to conform to the contours of the underside of the plates, thereby maintaining the coplanarity of the regions of the underside adjacent the gap. The latter system is particularly advantageous when the steel sheets have irregularities in the direction of the welding gap.

The above and other objects, features and advantages of the present invention will become more readily apparent from the following description and specific example, reference being made to the accompanying drawing in which:

FIG. 1 is a diagrammatic vertical cross-sectional view transverse to the welding gap, of a system for carrying out the present invention; and FIG. 2 is a diagrammatic elevational view, one plate removed, showing a modified system.

In FIG. 1 of the drawing, we show a pair of steel plates 1 whose thicknesses $t$ exceed 8 mm. and whose confronting edges constitute downwardly convergent flanks 12 of a trapezoidal gap 3 whose bottom is open with an aperture $d$. The mouth of the gap has the width D. The plates 1 are welded together by a submerged-arc welding head 2 of conventional construction, the welding wire 13 being fed continuously to the head from a supply represented at 14. Since all welding according to the present invention takes place from only one side of the plates, namely the upper side, there is no need for reversing the plates and welding from their undersides 15.

The upwardly open gap 3 is of V-profile, although U-profile and Y-profile constructions also may be used. Other profiles (e.g. I-configuration) are unsuitable for the most part. The gap 3 is filled to a predetermined height $f$ with steel granules 4 which may be overlain by the welding-flux powder 16. The angle included between the flanks of the gap 3 is represented at $\alpha$. The device is provided with an adjustable source 17 of welding current which may be regulated to set the welding "heat" and/or current amplitude. The welding current source may be coupled with a control 18, following the feed of the welding wire 13 to ensure that the melting of the electrode wire consumed, in terms of weight per unit time, is 1.0 to 1.4 times that of the steel granules. The filler materials within the gap, especially the steel granules 4, cool the welding arc and equalize irregularities in the flanks 12 which do not, therefore, require significant preparation beforehand. Without the granular steel filler, it is extremely difficult to obtain a throughgoing weld and substanially smaller arc power must be use. The result may be a poor seam. Of course, an excessive amount of steel granules in the gap is also unsatisfactory since deep-welding may be prevented.

As is shown in FIG. 2, the granular steel can be added by a feed tube 20 from a hopper (not shown) at the desired rate. To this end, the supply device 21 for the welding wire 22 of the head 23 is coupled via a control 24 with the feed means 20. The latter is disposed ahead of the welding head 23 and is followed by a dispenser 25 of the welding flux powder. The metallurgical character of the weld is, of course, determined by the composition of the granular steel.

Beneath the plate 1, we provide an upwardly open channel-shaped housing 5 which extends the full length of the welding gap 3 and receives a copper rail 6, here forming the temperature-insensitive layer. The copper rail 6 is provided with an upwardly open trough 11 registering with the gap 3 and having a ratio of width W to depth $w$ between 5:1 and 12:1. The copper rail 6 is held against the underside 15 of the plates 1 by an inflatable bladder in the form of a fabric-reinforced fire-fighting hose 9 which is connected with a source of pressure 28 via a valve 29 permitting careful adjustment of the pressure applied upwardly to the rail 6 as described below. The fire hose 9 applies upward force to a wooden piston or plunger 8 which may be subdivided longitudinally as previously discussed. Force transmission between the plunger 8 and the rail 6 is effected via a mass 7 of loose refractory material serving as a force-distribution and heat-insulating medium. The fluid supplied to the wire hose can be water or air. Other backing layers which have been found to be suitable are fabrics of mineral (especially glass) fibers which do not generate gas upon heating although layers of welding-flux powder, burned clay powder porcelain sand can also be used according to this invention.

It is important to note that a complete seal is provided by the backing layer along the welding gap 3 against the underside 15 of the plates. The layer 7 may suitably be composed of dry welding sand or welding-flux powder. The plunger 8 preferably consists of a number of longitudinally separated blocks of wood. The pressure applied to the backing layer, measured at the hose 9, should be 0.1 to 0.3 atmospheres above atmospheric pressure although 0.2 atmospheres have been found to be most desirable. The magnetic bands 10 are spaced from the gap 3 by a distance from 50 to 100 mm. and at least sufficient to prevent any magnetic influence upon the submerged arc. The bands may consist of a plurality of individual permanent magnets although electromagnets as shown at 29 in FIG. 2 are preferred. The coils 30 of the electromagnet are connected in series and in circuit via a contact roller 31 engageable with the contact bands on the underside of the strip 10′, in a circuit 32 whose source 33 lies in series with a switch 34. The latter is opened to release the bands. As is also demonstrated in FIG. 2, each of the magnets 29 forms a complete flux path 35 through the respective plate so that there is no flux leakage across the gap 3 to affect the arc.

EXAMPLE

Using the system basically shown in FIG. 1, with an angle $\alpha$ between the flanks 12 of 50°, a thickness of the plates 1 just above 15 mm., a mean gap width $b$ (in cm.) of 0.5 cm., and a steel granule mass with a height $f$ in the gap of 0.8 cm. The welding speed of the head 2 was 30 cm./min. the steel granule mass had a bulk density of 4.8 g./cm.³ (loose packed bulk weight). The electrode wire ablation rate is 0.2 g./min.×A. The welding current I is then determined by the relationship $$I = \frac{\left(b \times f + f^2 \times \tangent\left(\frac{\alpha}{2}\right)\right) \times v \times s}{L} \times F$$

where $b$ is the average gap width in cm.,
$f$ is the loose-filled height of the steel granules in cm.,
$\alpha$ is the angle between the flanks,
$v$ is the welding speed in cm./min.,
$s$ is the bulk density of the steel granules in g./cm.³,
$L$ is the ablation rate of the welding electrode in g./min.×A, and $F$ is a factor, as described above, consisting of the weight ratio per unit time of the ablated welding wire to the steel granules.

This factor, $F=1.25$ in the present example, can be somewhat smaller when the backing layer 6 is a mineral fiber (e.g. $F=1.1$). In the present example, however, a copper rail is used with $F=1.25$, thereby giving a welding current of about 650 amp. The weld, carried with this current is of uniform appearance and character and high quality throughout its length. Any depression in the weldment can be filled in with one or more additional beads.

We claim:
1. A submerged-arc method of welding a seam between a pair of steel plates, comprising the steps of:
    (a) positioning said plates with juxtaposed edges forming an elongated, downwardly and upwardly open welding gap between them, said edges forming an upwardly widened trough;
    (b) retaining the undersides of said plates in coplanar relationship at least in the region adjoining said gap while applying to the undersides of said plates a layer of temperature-insensitive material closing the bottom of said gap;
    (c) disposing at least along the bottom of said gap a mass of steel granules at least partly filling said gap and disposing above said steel granules a mass of arc-submerging welding flux powder; and
    (d) depositing weldment in said gap by relatively displacing an electrode wire, in a vertical median plane between said edges and said plates while passing an electric current therebetween of an intensity sufficient to effect submerged-arc deposition of the steel granules and electrode-wire material in said gap at a rate such that the weight of said electrode-wire material consumed per unit time is 1.0 to 1.4 times that of said steel granules deposited in said gap.

2. The method defined in claim 1 wherein said temperature-insensitive layer is a copper rail having an upwardly open trough registering with said gap and having a ratio of width to depth between substantially 5:1 and 12:1.

3. The method defined in claim 1 wherein said temperature-insensitive layer is applied against the undersides of said plates at a pressure between substantially 0.1 and 0.3 atmospheres above atmospheric pressure.

4. The method defined in claim 3 wherein said layer is a web of mineral fibers.

5. The method defined in claim 3 wherein said layer is a layer of mineral powder.

References Cited

UNITED STATES PATENTS

| | | | |
|---|---|---|---|
| 2,176,664 | 10/1939 | Burke | 219—161 X |
| 2,331,937 | 10/1943 | Schreiner | 219—73 |
| 2,696,547 | 12/1954 | Felton et al. | 219—130 X |
| 3,221,135 | 11/1965 | Maier | 219—137 |
| 3,264,445 | 8/1966 | Arnoldy | 219—73 X |
| 3,307,014 | 2/1967 | Bada et al. | 219—137 |

JOSEPH V. TRUHE, Primary Examiner

C. L. ALBRITTON, Assistant Examiner

U.S. Cl. X.R.

219—137